(12) United States Patent
Zhang

(10) Patent No.: US 10,423,737 B2
(45) Date of Patent: Sep. 24, 2019

(54) NUMERICAL SIMULATION OF OBJECTS BEING RELEASED ONTO A SURFACE IN A MANUFACTURING PROCESS

(71) Applicant: Livermore Software Technology Corporation, Livermore, CA (US)

(72) Inventor: Boning Zhang, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 214 days.

(21) Appl. No.: 15/651,419

(22) Filed: Jul. 17, 2017

(65) Prior Publication Data

US 2019/0018914 A1     Jan. 17, 2019

(51) Int. Cl.
    *G06F 17/50*      (2006.01)

(52) U.S. Cl.
    CPC ...... *G06F 17/5009* (2013.01); *G06F 17/5018* (2013.01); *G06F 17/5086* (2013.01); *G06F 2217/16* (2013.01)

(58) Field of Classification Search
None
See application file for complete search history.

(56) References Cited

PUBLICATIONS

D. Markauskas, Discrete element modelling of complex axisymmetrical particle flow, Technical University, Saulėtekio, ISSN 1392-1207. Mechanika. 2006. Nr.6(62), p. 32-38 (Year: 2006).*

Zumei Zheng et al., An improved 3D DEM-FEM contact detection algorithm for the interaction simulations between particles and structures, Powder Technology 305 (2017) 308-322, Available Oct. 1, 2016, (Year: 2016).*

Q.J. Zheng et al., A coupled FEM/DEM model for pipe conveyor systems: Analysis of the contact forces on belt, Powder Technology 314 (2017) 480-489, Available online Sep. 30, 2016, (Year: 2016).*

\* cited by examiner

*Primary Examiner* — Omar F Fernandez Rivas
*Assistant Examiner* — Michael Edward Cocchi
(74) *Attorney, Agent, or Firm* — Roger H. Chu

(57) ABSTRACT

Numerical simulation method includes receiving a manufacturing process configuration specification for moving various types of arbitrarily-shaped objects from an egress area onto a lower surface with desired mass flow rate in a predefined time period; creating a FEA model representing the lower surface; creating respective bonded discrete element models (BDEMs) representing the various types of the objects, each BDEM containing discrete elements connected by connection bonds; generating a list of BDEMs each with randomly-chosen types and orientation, such that total mass of the list of BDEMs exceeds a target total mass; and obtaining numerically-simulated physical behaviors of the objects in a time-marching simulation. At each solution cycle of the simulation, placing respective objects into randomly-selected 'open' sub-regions by activating next relevant portion of the BDEMs based on the mass flow rate and time-step size; releasing activated BDEMs from the egress area onto the lower surface.

18 Claims, 13 Drawing Sheets

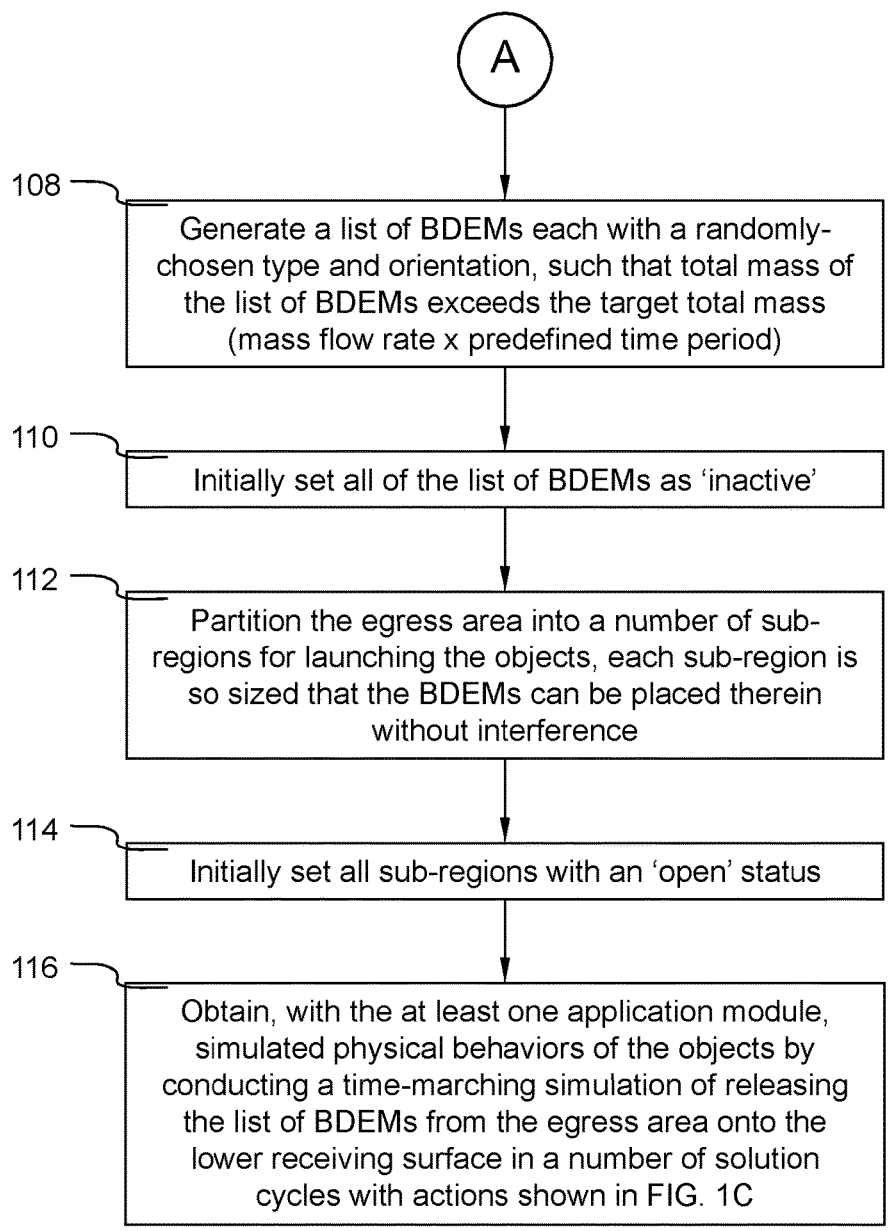

700

| 23 | 19 | 1  | 14 | 7  | 8  |
|----|----|----|----|----|----|
| 16 | 6  | 13 | 21 | 12 | 24 |
| 3  | 22 | 11 | 2  | 5  | 18 |
| 4  | 17 | 9  | 15 | 20 | 10 |

*FIG. 7*

NUMERICAL SIMULATION OF OBJECTS BEING RELEASED ONTO A SURFACE IN A MANUFACTURING PROCESS

FIELD

The invention generally relates to computer aided mechanical engineering analysis, more particularly to methods and systems for numerically simulating various arbitrarily-shaped objects being released onto a surface in a manufacturing process.

BACKGROUND

With advance of computer technology, computer aided engineering (CAE) have been used for helping engineers/scientists to design products in various industries. One of the first developed CAE technologies is finite element analysis (FEA), which is a computerized method widely used in industry to model and solve engineering problems relating to complex systems such as three-dimensional non-linear structural design and analysis. FEA derives its name from the manner in which the geometry of the object under consideration is specified.

The FEA software is provided with a model of the geometric description and the associated material properties at each point within the model (sometimes referred to as a FEA mesh model). In this model, the geometry of the system under analysis is represented by solids, shells and beams of various sizes, which are referred to as finite elements. The vertices of the finite elements are referred to as nodes. The model is comprised of a finite number of finite elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

Another technique is referred to as discrete element method (DEM) or distinct element method, which is generally used for numerically simulating the motion of a large number of particles. Today DEM is becoming widely accepted as an effective method of addressing engineering problems in granular and discontinuous materials.

Modern manufacturing process is generally automated with many machines in a factory. For example, one machine may be designed for drawing food products out of a hopper/container and feeding onto a conveyor for further processing. In order to properly design such example machine, many factors need to be considered, for example, type of food products, amount and speed of food products being released to the conveyor, and characteristics of the conveyor (e.g., angle, type, speed, etc.). Many prior art approaches are generally inefficient, for example, requiring a Priori knowledge, ad hoc design, etc. Therefore, it would be desirable to have improved systems and methods of numerically simulating various arbitrarily-shaped objects being released onto a receiving surface in a manufacturing process.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Methods and systems for numerically simulating of moving various arbitrarily-shaped objects from an egress area onto a lower receiving surface in a manufacturing process are disclosed.

According to one aspect of the invention, a numerical simulation method of moving various arbitrarily-shaped objects from an egress area onto a lower surface in manufacturing process. The example method includes: receiving, in a computer system, a manufacturing process configuration specification for moving various types of arbitrarily-shaped objects from a horizontal egress area onto a lower receiving surface with desired mass flow rate in a predefined time period, the specification defining properties of each of the various types of the arbitrarily-shaped objects including shape, size, strength and mass distribution, the specification further defining size and shape of the egress area and characteristics of the lower receiving surface; creating a finite element analysis (FEA) model representing the lower receiving surface corresponding to the defined characteristics including width, relative location and orientation to the egress area; creating respective bonded discrete element models (BDEMs) representing the various types of the arbitrarily-shaped objects, each BDEM containing a plurality of discrete elements connected by connection bonds in accordance with the defined properties; generating a list of BDEMs each with randomly-chosen types and orientation, such that total mass of the list of BDEMs exceeds a target total mass derived from the mass flow rate and the predefined time period; initially setting all of the list of BDEMs as inactive; partitioning the egress area into a number of sub-regions for launching the arbitrarily-shaped objects, each of the sub-regions being so sized that the BDEMs can be placed therein without interference; initially setting all sub-regions with an 'open' status; and obtaining numerically-simulated physical behaviors of the arbitrarily-shaped objects by conducting a time-marching simulation of releasing the list of BDEMs from the egress area onto the lower receiving surface in a plurality of solution cycles as follows:

(a) setting simulation time to the beginning of the predefined time period;

(b) placing respective arbitrarily-shaped objects into randomly-selected ones of the 'open' sub-regions by activating next relevant portion of the list of BDEMs based on the mass flow rate and time-step size;

(c) setting each randomly-selected 'open' sub-region to an 'occupied' status;

(d) releasing the newly-activated BDEMs from the egress area onto the lower receiving surface;

(e) calculating a corresponding contact force in each detected contact amongst the activated BDEMs and/or between the activated BDEMs and the lower receiving surface;

(f) applying the contact force to each involved parties in said each detected contact to determine each activated BDEM's updated location and to update internal forces in the corresponding connection bonds;

(g) setting corresponding 'occupied' sub-regions to 'open' status, when the activated BDEMs have moved entirely out of the egress area;

(h) incrementing the simulation time by the time-step size; and (i) repeating (b)-(h) for next solution cycle until the simulation time has passed the end of the predefined time period.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

FIGS. 1A-1C collectively show a flowchart illustrating an example process of numerically simulating of moving various arbitrarily-shaped objects from an egress area onto a lower receiving surface in manufacturing process, according to an embodiment of the invention;

FIG. 7 is a diagram showing an example egress area partitioned into a number of 'open' sub-regions in accordance with one embodiment of the invention;

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to FIGS. 1A-11. However, those skilled in the art will readily appreciate that the detailed description given herein with respect to these figures is for explanatory purposes as the invention extends beyond these limited embodiments.

Figure 1A:
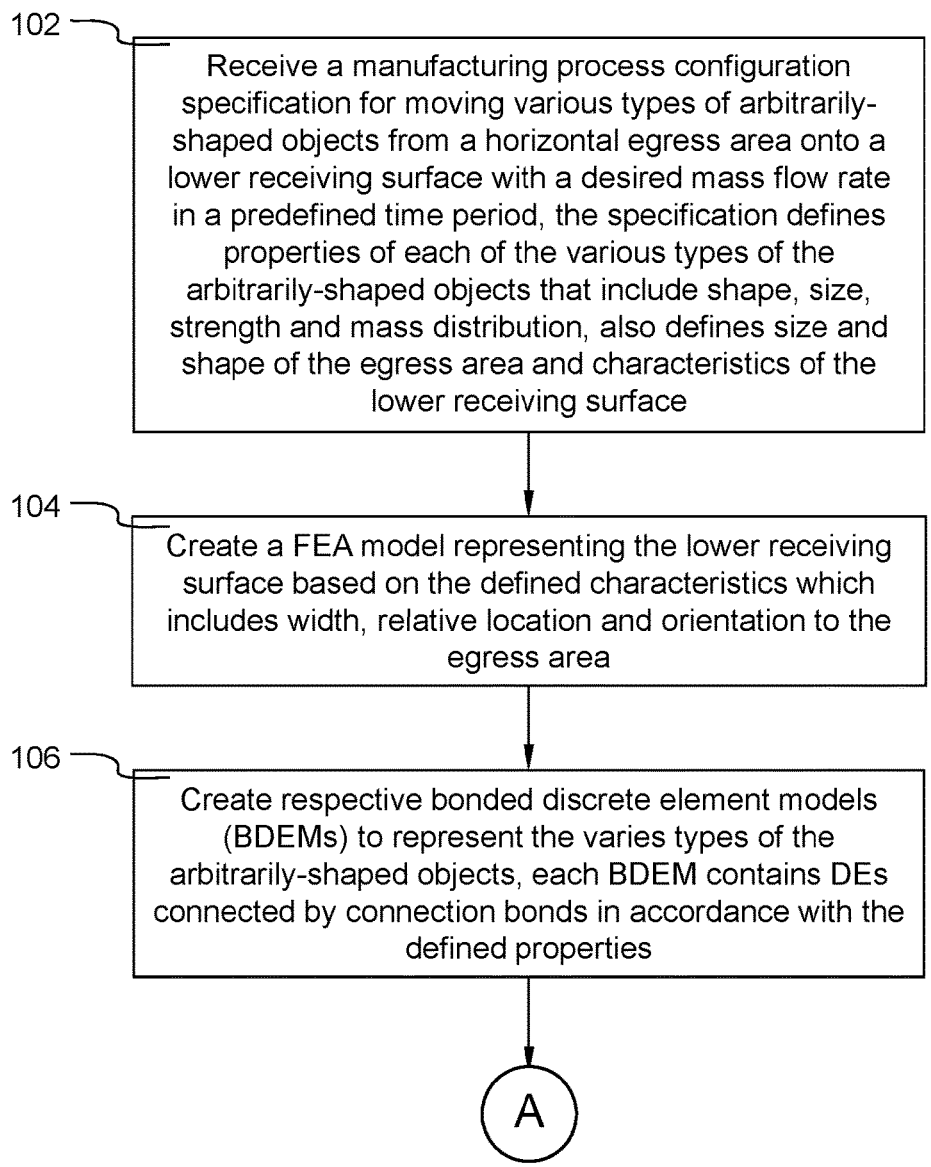
Figure 1C:
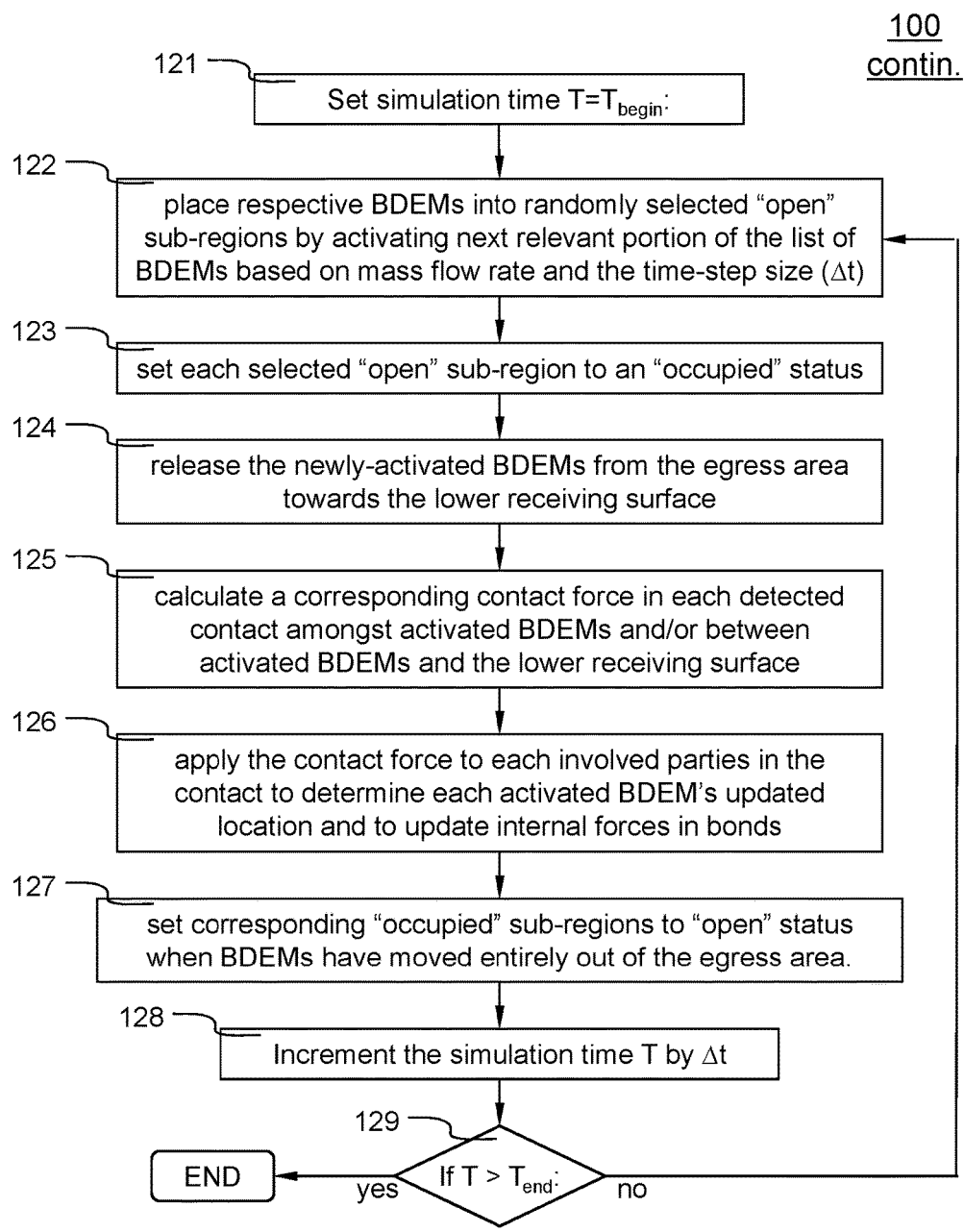

Referring first to FIGS. 1A-1C, it is collectively shown a flowchart illustrating an example process 100 of numerically simulating of moving various arbitrarily-shaped objects from an egress area onto a lower surface in manufacturing process in accordance with an embodiment of the invention. Process 100 is preferably implemented in software and understood with other figures.

Process 100 starts at action 102 by receiving a manufacturing process configuration specification for moving various types of arbitrarily-shaped objects from a horizontal egress area onto a lower receiving surface with a desired mass flow rate in a predefined time period in a computer system (e.g., computer system 1100 of FIG. 11) having at least one application module installed thereon. Application module may be software products based on finite element method, discrete element method, etc. The term "horizontal" used herein is as a reference orientation, for example, horizontal egress area is shown horizontally in the figures, which is perpendicular to the direction of gravity.

The manufacturing process configuration specification defines properties of each type of the arbitrarily-shaped objects that include shape, size, strength and mass distribution, etc. The configuration specification also defines size and shape of the egress area and characteristics of the lower receiving surface.

At action 104, a finite element analysis (FEA) model is created for representing the lower receiving surface based on the defined characteristics, which includes, but is not limited to, width, relative location and orientation to the egress area.

Figure 2:
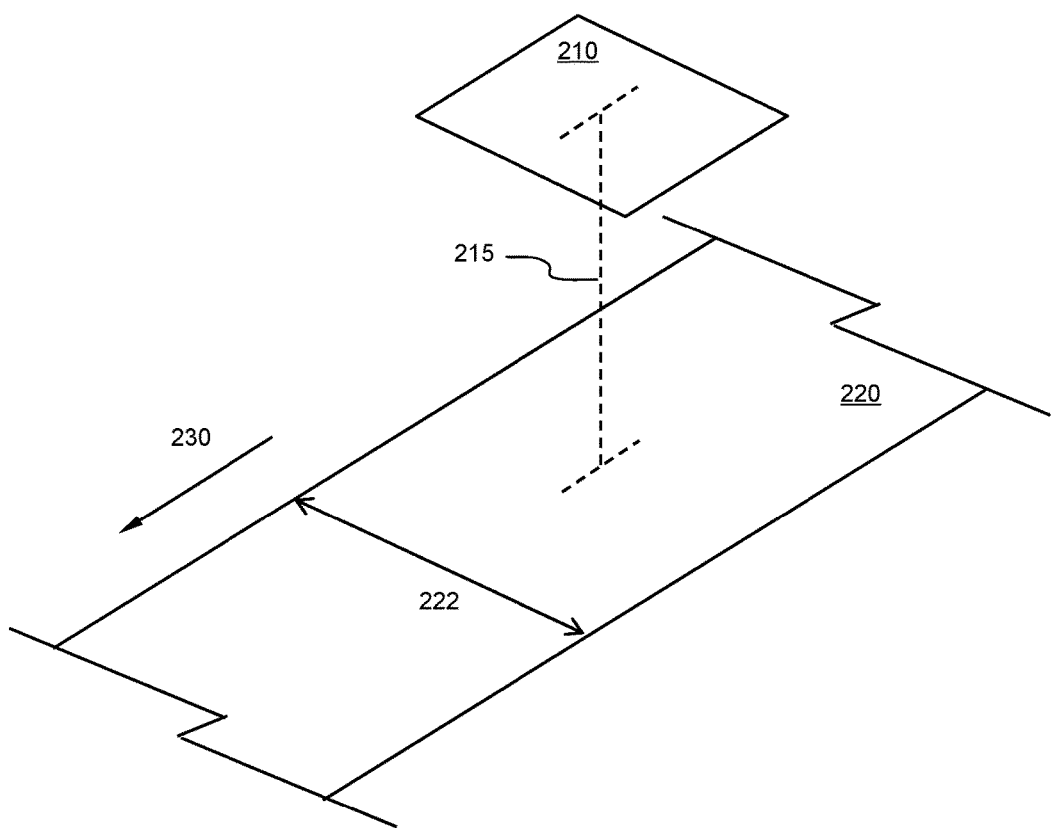
FIG. 2 is a diagram showing a first example manufacturing process configuration, according to an embodiment of the invention.

FIG. 2 is a diagram showing a first example manufacturing process configuration 200 showing a horizontal egress area 210, a lower receiving surface 220. Various arbitrarily-shaped objected are moved from the egress area 210 onto the lower receiving surface 220. The receiving lower surface 220 has a width 222 and optional moving speed 230 (e.g., a conveyor). The relative location and orientation of the lower receiving surface 220 in relation to the egress area 210 can be defined by a distance 215 and slope of the lower surface (see examples shown in FIGS. 4A-4C).

Figure 3:
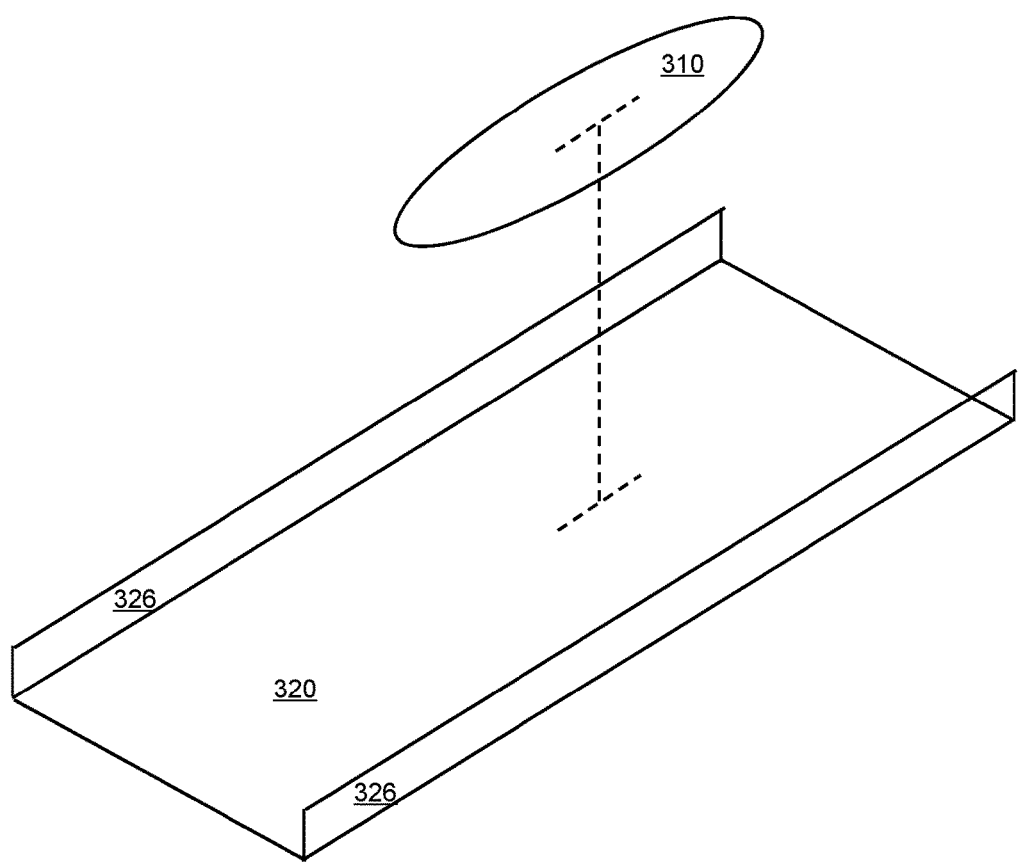
FIG. 3 is a diagram showing a second example manufacturing process configuration, according to an embodiment of the invention.

FIG. 3 shows a second example manufacturing process configuration 300. Egress area 310 has an elliptical area instead of rectangular area of the first example. Lower receiving surface 320 contains raised edges or guard rails 326 located on either side. Raised edges 326 may provide certain protection for objects being bounced out when dropping down from the egress area 320.

Three example different relative locations 415a-c and orientations of a lower receiving surface 420a-c to the egress area 410a-c are shown as vertical elevation views in FIGS.

Figure 4A:
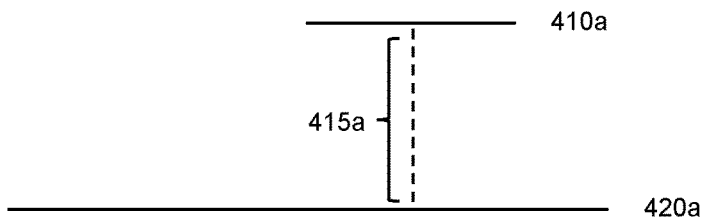
FIGS. 4A-4C are elevation profiles showing examples of relative location and orientation of the lower receiving surface in relation to the horizontal egress area in accordance with an embodiment of the invention.
Figure 4B:
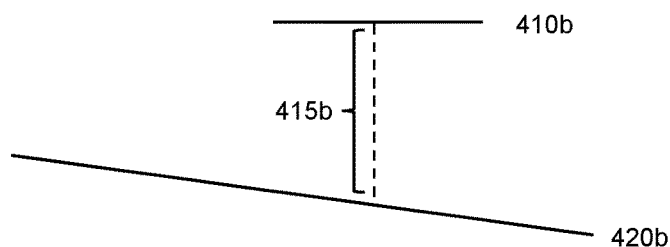
Figure 4C:
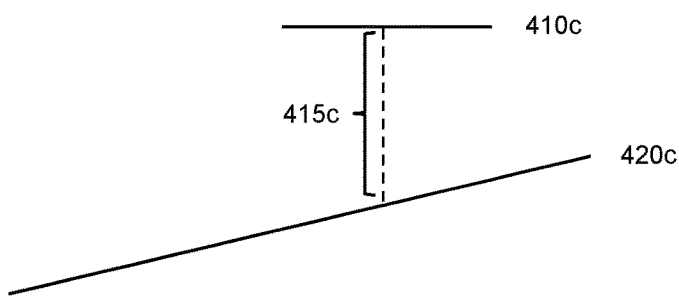

4A-4C. In FIG. 4A, egress area 410*a* and lower receiving surface 420*a* are in parallel. In FIGS. 4B-4C, egress area 410*b-c* and lower receiving surface 420*b-c* are not parallel to each other. In other words, the slopes are different in the examples shown in FIGS. 4A-4C.

Figure 5:
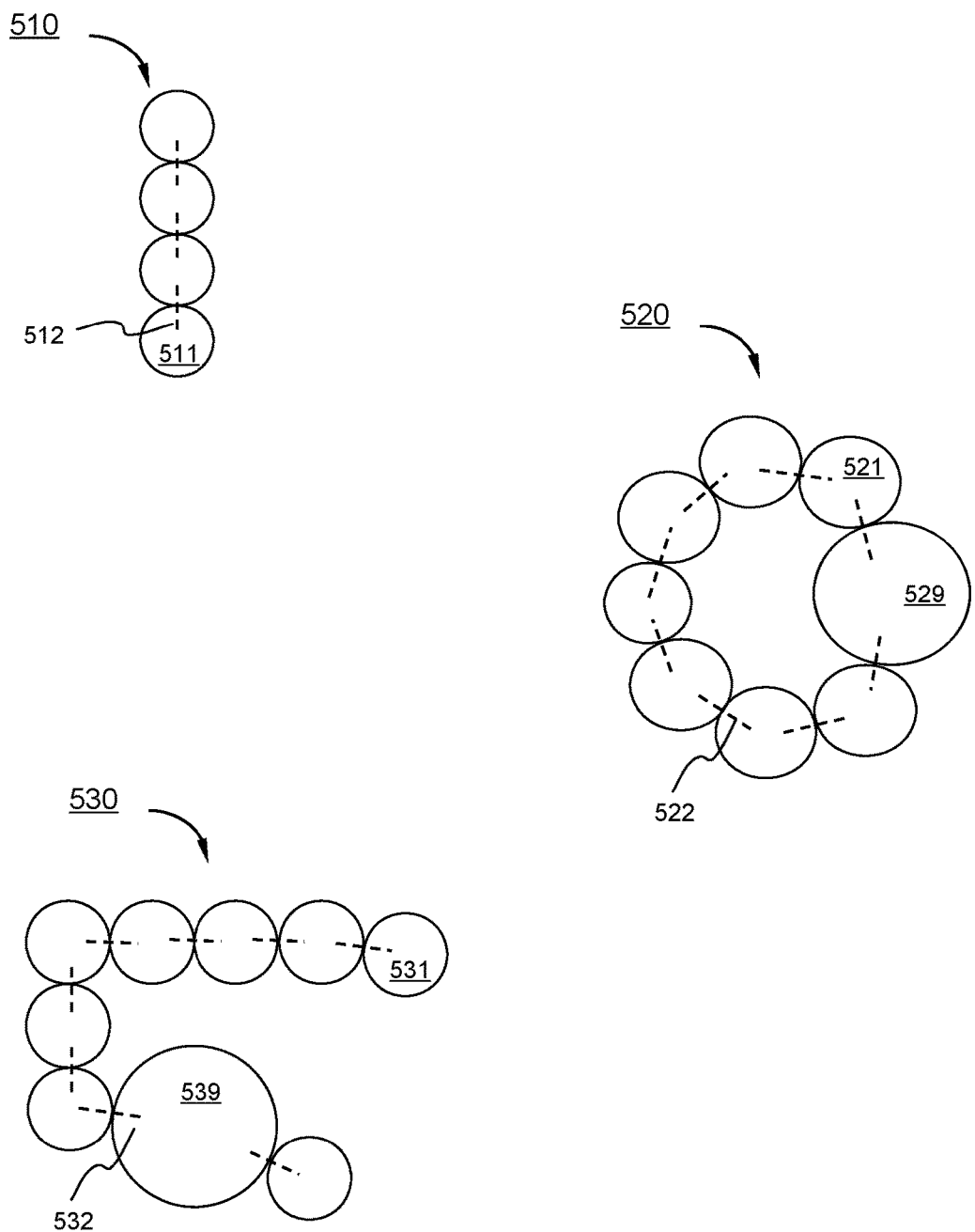
FIG. 5 is a two-dimensional view depicting three example bonded discrete element models (BDEMs), according to an embodiment of the invention.

Next, at action 106, respective bonded discrete element models (BDEMs) are created for representing the various types of the arbitrarily-shaped objects. Each BDEM contains a plurality of discrete elements connected by connection bonds in accordance with defined properties received in the manufacturing process configuration specification. FIG. 5 shows three examples of BDEMs. Each BDEM contains a plurality of either homogeneous or heterogeneous discrete elements (i.e., circles in two-dimension or spheres in three-dimension). Discrete elements are connected by the connection bonds (shown as broken lines). Based on defined properties, any arbitrarily-shaped objects can be modeled with this methodology. Connection bonds can be used for representing the structural strength, while discrete elements represent shape, size and mass distribution. The first example BDEM 510 contains four substantially similar sized discrete elements 511 connected by three connection bonds 512 in a bar type of structure (i.e., an I-shaped object). The second example BDEM 520 contains seven substantially similar discrete elements (DEs) 521 and one larger DE 529 connected by connection bonds 522 in a ring type of structure (i.e., an O-shaped object). The third example BDEM 530 contains one DE 539 and eight smaller DEs 531 connected by connection bonds 532 in a C-shaped object.

Figure 6:
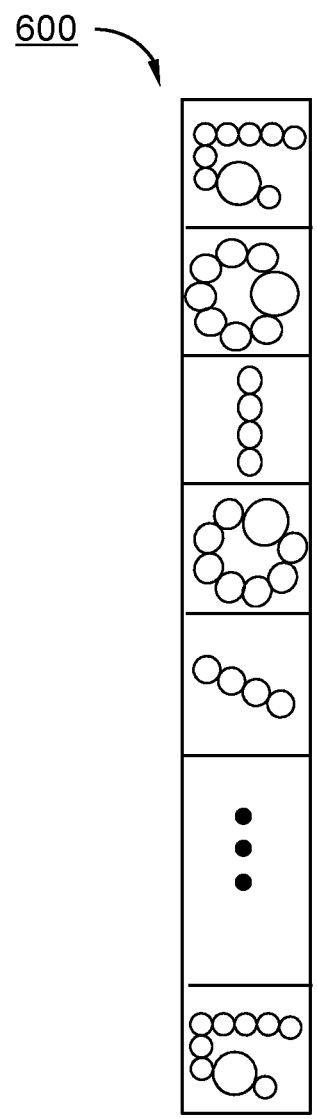
FIG. 6 is a diagram showing an example list of BDEMs in accordance with one embodiment of the invention.

Next, at action 108, a list of BDEMs is generated. Each BDEM in the list has a randomly-chosen type (e.g., one of the three types shown in FIG. 5) along with a randomly-chosen orientation (i.e., each object may be arbitrarily-rotated in a space either two- or three-dimensional). An example list of BDEMs 600 is shown in FIG. 6.

In order to ensure the desired mass flow rate in a predefined time period defined in the manufacturing process configuration specification, the total mass of the list is calculated as each BDEM is added. When the total mass of the list has exceeded the target total mass, the list is completed. The target total mass is equal to the desired mass flow rate multiplied by the predefined time period. All of the BDEMs in the list are initially set as 'inactive' including all discrete elements and corresponding connection bonds at action 110.

At action 112, the egress area is partitioned into a number of sub-regions for launching or releasing arbitrarily-shaped objects. Each of the sub-regions is so sized that the BDEMs in the list can be placed therein without any interference. In order to ensure no interference, the largest spatial dimension of the BDEMs in the list is used along with a margin of safety (e.g., a scalar factor of 2.5 may be used) for sizing the sub-regions. FIG. 7 shows an example egress area 700 being partitioned into 24 sub-regions, which are initially set to an 'open' status (i.e., available for placement of a BDEM from the list) at action 114.

Next at action 116, numerically-simulated physical behaviors of arbitrarily-shaped objects are obtained by conducting a time-marching simulation of releasing the list of BDEMs from egress area onto the lower receiving surface in a number of solution cycles for the predefined time period. The time-marching simulation is conducted with actions shown in FIG. 1C.

Process 100 sets the simulation time as the beginning of the predefined time period ($T_{begin}$) at action 121. Next, at action 122, respective BDEMs are placed into randomly-chosen 'open' sub-regions by activating next relevant portion of the list of the BDEMs. Next relevant portion is determined by the defined mass flow rate along with the current time-step size ($\Delta t$) in the time-marching simulation. In other words, the total mass of the next relevant portion should substantially represent a target mass, which is the mass flow rate multiplied by $\Delta t$, which can be different at each solution cycle.

To demonstrate, the randomly-chosen 'open' sub-region, FIG. 7 shows an example random order to all 'open' sub-regions. In this example, all sub-regions are initially set with 'open' status. In one embodiment, the first inactive BDEM in the list of BDEMs 600 is placed in sub-region marked as "1", the second inactive BDEM is placed in sub-region marked as "2", etc. In one embodiment, to accomplish placement of BDEMs into the 'open' sub-regions effectively and efficiently, each randomly-orientated BDEM is initially created in a local coordinate system. In one embodiment, such placement operations can be done with a translation of the coordinates from a local coordinate system to a global coordinate system. The local coordinate system is used for defining each BDEM, while the global coordinate system is sued for defining the manufacturing process configuration (e.g., egress area and lower receiving surface).

Figure 8:
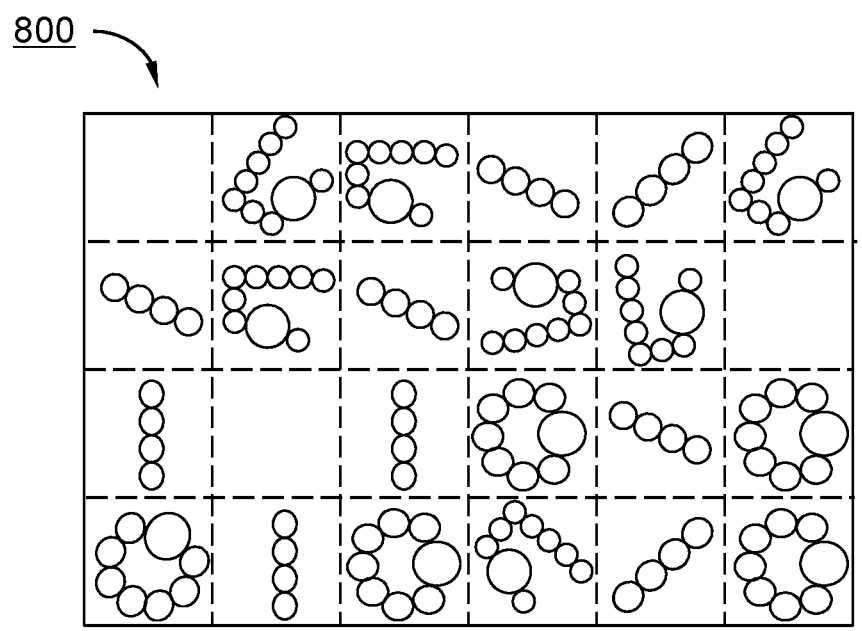
FIG. 8 is a diagram showing an example egress area after being placed with relevant portion of the list of BDEMs in accordance with one embodiment of the invention.

FIG. 8 shows an example egress area 800 after being placed with relevant portion of the list of BDEMs in selected 'open' sub-regions. These selected sub-regions (non-blank sub-regions) are then set to an 'occupied' status at action 123. The newly-activated BDEMs are released from the egress area towards the lower receiving surface at action 124. The release of newly-activated BDEMs can optionally be injected with an initial velocity. In the meantime, already-activated BDEMs are moved according to their own situations including, but not limited to, free falling, falling with initial velocity, reacting to contacts, etc.

Figure 9:
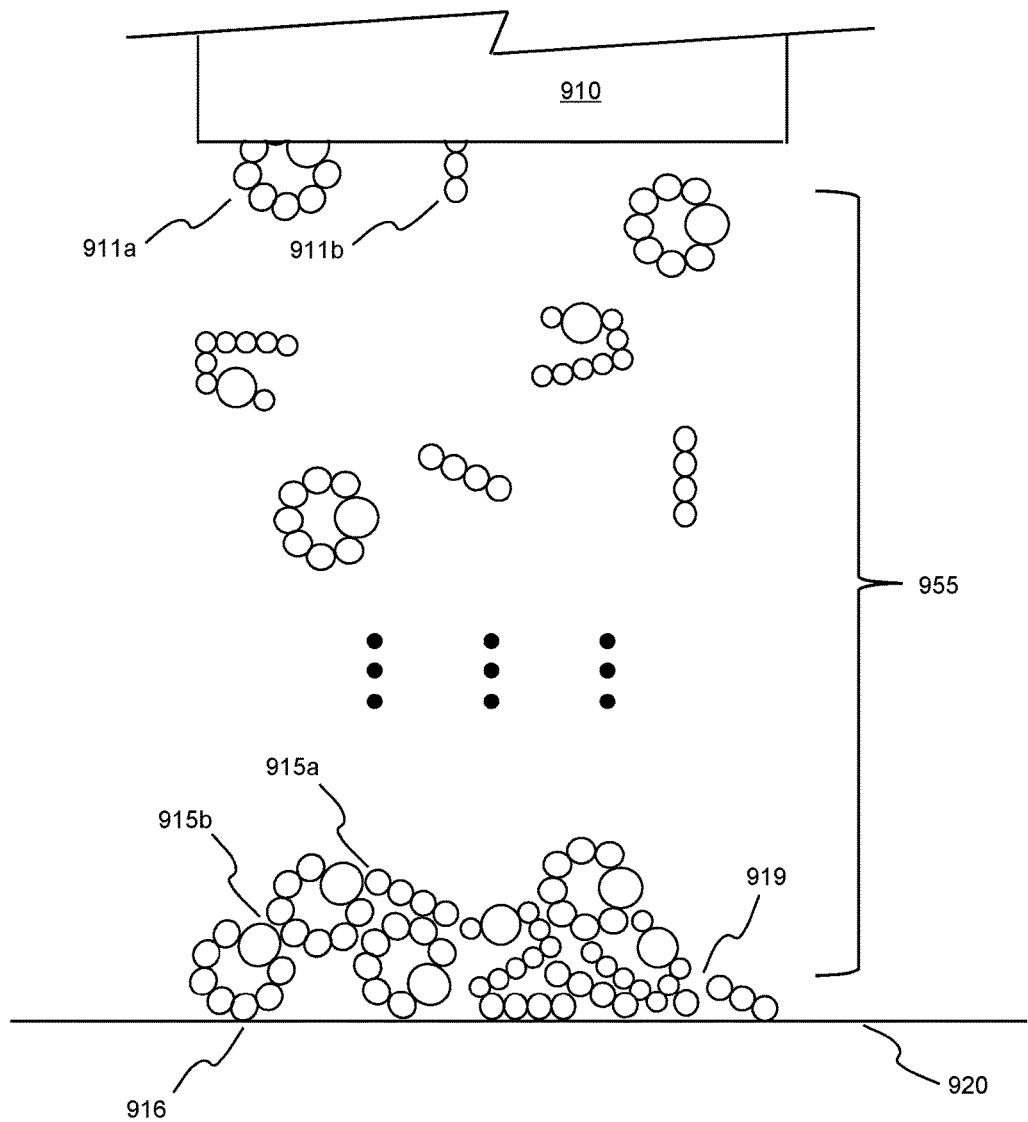
FIG. 9 is a diagram showing an example of moving various types of arbitrarily-shaped objects from an egress area onto a lower receiving surface in accordance with one embodiment of the invention.

FIG. 9 shows an example of moving various types of arbitrarily-shaped objects 955 from an egress area 910 onto a lower receiving surface 920. In order for illustration clarity and simplicity, the objects are not in scale (i.e., much larger).

At action 125, corresponding contact force is calculated in each detected contact, which may be contact amongst activated BDEMs (e.g., shown as 915*a-b* in FIG. 9) and/or between activated BDEMs and the lower receiving surface (e.g., shown as 916 in FIG. 9). The calculated contact force is then applied to the involved parties in each contact, at action 126, to determine each activated BDEM's updated location and to update internal forces in corresponding connection bonds. In one embodiment, connection bond may break due to the internal force beyond the strength (e.g., see example breakage of BDEM 919 in FIG. 9).

Figure 10:
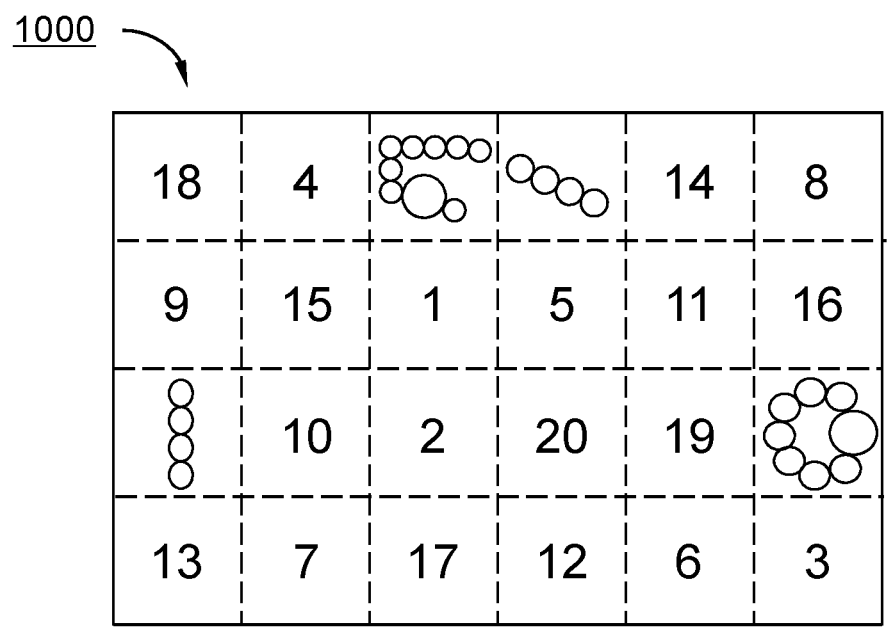
FIG. 10 is a diagram showing an example egress area after each solution cycle of a time-marching simulation of moving various types of arbitrarily-shaped objects from an egress area onto a lower receiving surface in accordance with one embodiment of the invention.

At action 127, when newly-activated BDEMs have moved entirely out of the egress area, the corresponding 'occupied' sub-regions are reset to 'open' status available for next portion of the list of BDEMs. FIG. 10 shows an example of egress area 1000 after 'occupied' sub-regions are reset to 'open' status (numbers shown are randomly-ordered). In this example shown in FIG. 10, there are 20 'open' sub-regions at the end of a solution cycle. Four newly-activated BDEMs still occupy their respective sub-regions. The example shown in FIG. 9 also demonstrates few BDEMs 911*a-b* occupying respective sub-regions in the egress area 910.

The simulation time is incremented by $\Delta t$ at action 128. Then, process 100 moves to decision 129 for determining whether the simulation time has passed the end of the predefined time period ($T_{end}$). If not, process 100 moves back to repeat actions 122-128 till the decision 129 becomes true. Process 100 ends thereafter.

Figure 11:
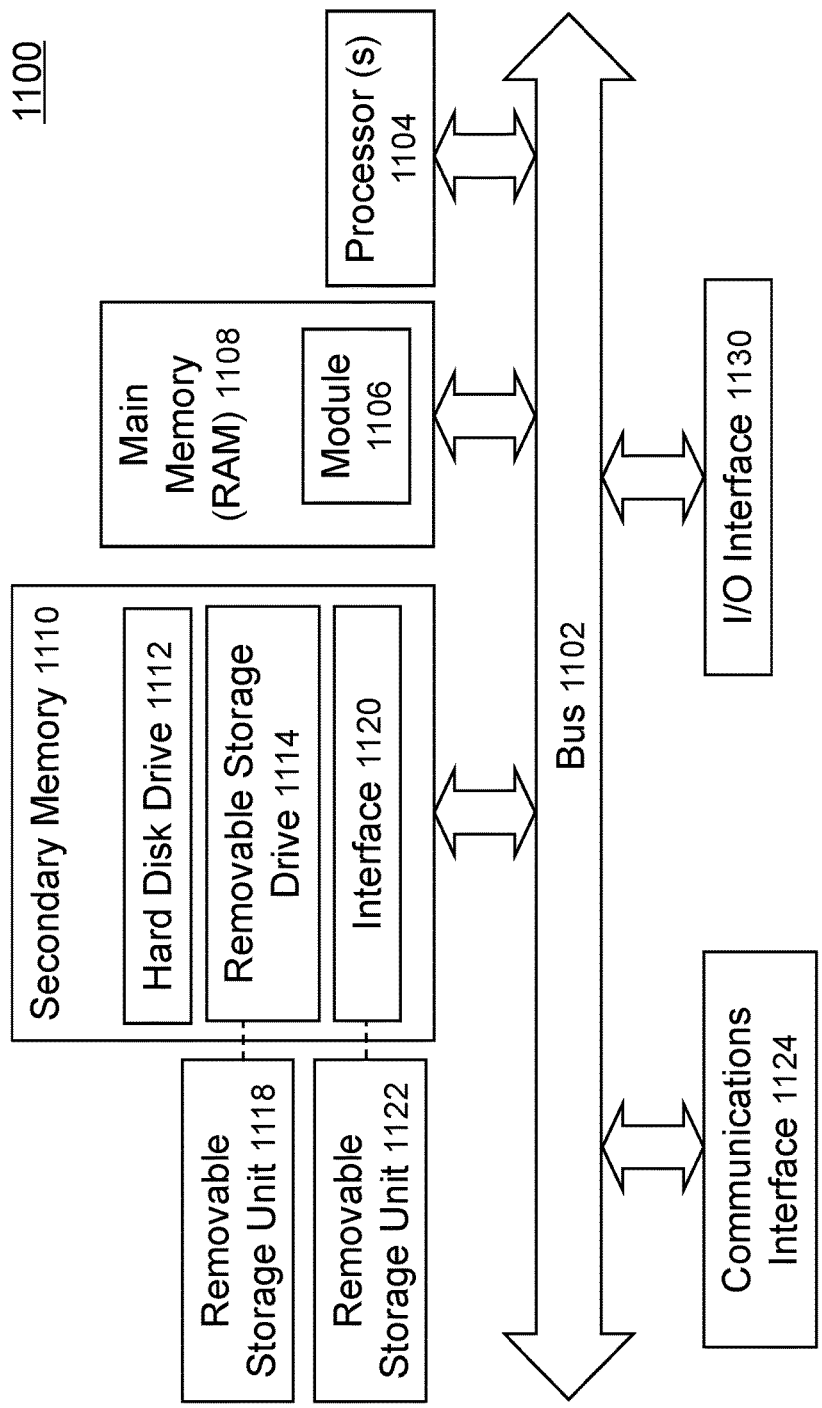
FIG. 11 is a function diagram showing salient components of a computing device, in which an embodiment of the invention may be implemented.

According to one aspect, the invention is directed towards one or more computer systems capable of carrying out the functionality described herein. An example of a computer system 1100 is shown in FIG. 11. The computer system 1100 includes one or more processors, such as processor 1104. The processor 1104 is connected to a computer system internal communication bus 1102. Various software embodiments are described in terms of this exemplary computer system. After reading this description, it will become apparent to a person skilled in the relevant art(s) how to implement the invention using other computer systems and/or computer architectures.

Computer system 1100 also includes a main memory 1108, preferably random access memory (RAM), and may also include a secondary memory 1110. The secondary memory 1110 may include, for example, one or more hard disk drives 1112 and/or one or more removable storage drives 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other similar means for allowing computer programs or other instructions to be loaded into computer system 1100. Such means may include, for example, a removable storage unit 1122 and an interface 1120. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 1122 and interfaces 1120 which allow software and data to be transferred from the removable storage unit 1122 to computer system 1100. In general, Computer system 1100 is controlled and coordinated by operating system (OS) software, which performs tasks such as process scheduling, memory management, networking and I/O services.

There may also be a communications interface 1124 connecting to the bus 1102. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. Software and data transferred via communications interface 1124. The computer 1100 communicates with other computing devices over a data network based on a special set of rules (i.e., a protocol). One of the common protocols is TCP/IP (Transmission Control Protocol/Internet Protocol) commonly used in the Internet. In general, the communication interface 1124 manages the assembling of a data file into smaller packets that are transmitted over the data network or reassembles received packets into the original data file. In addition, the communication interface 1124 handles the address part of each packet so that it gets to the right destination or intercepts packets destined for the computer 1100. In this document, the terms "computer program medium", "computer readable medium", "computer recordable medium" and "computer usable medium" are used to generally refer to media such as removable storage drive 1114 (e.g., flash storage drive), and/or a hard disk installed in hard disk drive 1112. These computer program products are means for providing software to computer system 1100. The invention is directed to such computer program products.

The computer system 1100 may also include an input/output (I/O) interface 1130, which provides the computer system 1100 to access monitor, keyboard, mouse, printer, scanner, plotter, and alike.

Computer programs (also called computer control logic) are stored as application modules 1106 in main memory 1108 and/or secondary memory 1110. Computer programs may also be received via communications interface 1124. Such computer programs, when executed, enable the computer system 1100 to perform the features of the invention as discussed herein. In particular, the computer programs, when executed, enable the processor 1104 to perform features of the invention. Accordingly, such computer programs represent controllers of the computer system 1100.

In an embodiment where the invention is implemented using software, the software may be stored in a computer program product and loaded into computer system 1100 using removable storage drive 1114, hard drive 1112, or communications interface 1124. The application module 1106, when executed by the processor 1104, causes the processor 1104 to perform the functions of the invention as described herein.

The main memory 1108 may be loaded with one or more application modules 1106 (e.g., FEM and/or DEM application module) that can be executed by one or more processors 1104 with or without a user input through the I/O interface 1130 to achieve desired tasks. In operation, when at least one processor 1104 executes one of the application modules 1106, the results are computed and stored in the secondary memory 1110 (i.e., hard disk drive 1112). The status of the analysis is reported to the user via the I/O interface 1130 either in a text or in a graphical representation upon user's instructions.

Although the invention has been described with reference to specific embodiments thereof, these embodiments are merely illustrative, and not restrictive of, the invention. Various modifications or changes to the specifically disclosed exemplary embodiments will be suggested to persons skilled in the art. For example, whereas most of the examples have been described and shown as two-dimensional objects, for example, three-dimensional objects can be served to accomplish the same. Additionally, rectangular egress area with 24 sub-regions have been described and shown, other type, shape and size of egress area may be used to achieve the same. Furthermore, only three types of arbitrarily-shaped objects have been described and shown, other number of types may be used for accomplishing the same. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A numerical simulation method of moving arbitrarily-shaped objects from an egress area onto a lower receiving surface in a manufacturing process comprising:

receiving, in a computer system having at least one application module installed thereon, a manufacturing process configuration specification for moving various types of arbitrarily-shaped objects from a horizontal egress area onto a lower receiving surface with desired mass flow rate in a predefined time period, the specification defining properties of each of the various types of the arbitrarily-shaped objects including shape, size, strength and mass distribution, the specification further defining size and shape of the egress area and characteristics of the lower receiving surface;

creating, with the at least one application module, a finite element analysis (FEA) model representing the lower receiving surface corresponding to the defined characteristics including width, relative location and orientation to the egress area;

creating, with the at least one application module, respective bonded discrete element models (BDEMs) representing the various types of the arbitrarily-shaped objects, each BDEM containing a plurality of discrete elements connected by connection bonds in accordance with the defined properties;

generating, with the at least one application module, a list of BDEMs each with randomly-chosen types and orientation, such that total mass of the list of BDEMs exceeds a target total mass derived from the mass flow rate and the predefined time period;

initially setting, with the at least one application module, all of the list of BDEMs as inactive;

partitioning, with the at least one application module, the egress area into a number of sub-regions for launching the arbitrarily-shaped objects, each of the sub-regions being so sized that the BDEMs can be placed therein without interference;

initially setting, with the at least one application module, all sub-regions with a status of 'open'; and obtaining, with the at least one application module, numerically-simulated physical behaviors of the arbitrarily-shaped objects by conducting a time-marching simulation of releasing the list of BDEMs from the egress area onto the lower receiving surface in a plurality of solution cycles as follows:
(a) setting simulation time to the beginning of the predefined time period;
(b) placing respective arbitrarily-shaped objects into randomly-selected sub-regions having the status of 'open' by activating next relevant portion of the list of BDEMs based on the mass flow rate and time-step size;
(c) setting the status of the randomly-selected sub-regions that have been placed with the respective arbitrarily-shaped objects from 'open' to 'occupied';
(d) releasing the newly-activated BDEMs from the egress area onto the lower receiving surface;
(e) calculating a corresponding contact force in each detected contact amongst the activated BDEMs and/or between the activated BDEMs and the lower receiving surface;
(f) applying the contact force to each involved parties in said each detected contact to determine each activated BDEM's updated location and to update internal forces in the corresponding connection bonds;
(g) setting the status of those corresponding sub-regions from 'occupied' to 'open', when the activated BDEMs have moved entirely out of the egress area;
(h) incrementing the simulation time by the time-step size; and
(i) repeating (b)-(h) for next solution cycle until the simulation time has passed the end of the predefined time period.

2. The method of claim 1, wherein the ingress area comprises a rectangular area.

3. The method of claim 1, wherein the ingress area comprises an elliptical area.

4. The method of claim 1, wherein the lower receiving surface is a conveyor belt surface traveling at a preset speed.

5. The method of claim 1, wherein the size of each sub-region is based on a largest dimension of the BDEMs with an additional margin of safety.

6. The method of claim 1, said releasing the activated BDEMs from the egress area onto the lower receiving surface is achieved with an initial velocity.

7. A system for numerically simulating of moving arbitrarily-shaped objects from an egress area onto a lower receiving surface in a manufacturing process comprising;
a memory for storing computer readable code for at least one application module;
at least one processor coupled to the memory, said at least one processor executing the computer readable code in the memory to cause the at least one application module to perform operations of:
receiving a manufacturing process configuration specification for moving various types of arbitrarily-shaped objects from a horizontal egress area onto a lower receiving surface with desired mass flow rate in a predefined time period, the specification defining properties of each of the various types of the arbitrarily-shaped objects including shape, size, strength and mass distribution, the specification further defining size and shape of the egress area and characteristics of the lower receiving surface;
creating a finite element analysis (FEA) model representing the lower receiving surface corresponding to the defined characteristics including width, relative location and orientation to the egress area;
creating respective bonded discrete element models (BDEMs) representing the various types of the arbitrarily-shaped objects, each BDEM containing a plurality of discrete elements connected by connection bonds in accordance with the defined properties;
generating a list of BDEMs each with randomly-chosen types and orientation, such that total mass of the list of BDEMs exceeds a target total mass derived from the mass flow rate and the predefined time period;
initially setting all of the list of BDEMs as inactive;
partitioning the egress area into a number of sub-regions for launching the arbitrarily-shaped objects, each of the sub-regions being so sized that the BDEMs can be placed therein without interference;
initially setting all sub-regions with a status of 'open'; and
obtaining numerically-simulated physical behaviors of the arbitrarily-shaped objects by conducting a time-marching simulation of releasing the list of BDEMs from the egress area onto the lower receiving surface in a plurality of solution cycles as follows:
(a) setting simulation time to the beginning of the predefined time period;
(b) placing respective arbitrarily-shaped objects into randomly-selected sub-regions having the status of 'open' by activating next relevant portion of the list of BDEMs based on the mass flow rate and time-step size;
(c) setting the status of the randomly-selected sub-regions that have been placed with the respective arbitrarily-shaped objects from 'open' to 'occupied' status;

(d) releasing the newly-activated BDEMs from the egress area onto the lower receiving surface;
(e) calculating a corresponding contact force in each detected contact amongst the activated BDEMs and/or between the activated BDEMs and the lower receiving surface;
(f) applying the contact force to each involved parties in said each detected contact to determine each activated BDEM's updated location and to update internal forces in the corresponding connection bonds;
(g) setting the status of those corresponding sub-regions from 'occupied' to 'open', when the activated BDEMs have moved entirely out of the egress area;
(h) incrementing the simulation time by the time-step size; and
(i) repeating (b)-(h) for next solution cycle until the simulation time has passed the end of the predefined time period.

8. The system of claim 7, wherein the ingress area comprises a rectangular area.

9. The system of claim 7, wherein the ingress area comprises an elliptical area.

10. The system of claim 7, wherein the lower receiving surface is a conveyor belt surface traveling at a preset speed.

11. The system of claim 7, wherein the size of each sub-region is based on a largest dimension of the BDEMs with an additional margin of safety.

12. The system of claim 7, said releasing the activated BDEMs from the egress area onto the lower receiving surface is achieved with an initial velocity.

13. A non-transitory computer readable medium containing instructions for numerically simulating of moving arbitrarily-shaped objects from an egress area onto a lower receiving surface in a manufacturing process, by a method comprising:
receiving, in a computer system having at least one application module installed thereon, a manufacturing process configuration specification for moving various types of arbitrarily-shaped objects from a horizontal egress area onto a lower receiving surface with desired mass flow rate in a predefined time period, the specification defining properties of each of the various types of the arbitrarily-shaped objects including shape, size, strength and mass distribution, the specification further defining size and shape of the egress area and characteristics of the lower receiving surface;
creating, with the at least one application module, a finite element analysis (FEA) model representing the lower receiving surface corresponding to the defined characteristics including width, relative location and orientation to the egress area;
creating, with the at least one application module, respective bonded discrete element models (BDEMs) representing the various types of the arbitrarily-shaped objects, each BDEM containing a plurality of discrete elements connected by connection bonds in accordance with the defined properties;
generating, with the at least one application module, a list of BDEMs each with randomly-chosen types and orientation, such that total mass of the list of BDEMs exceeds a target total mass derived from the mass flow rate and the predefined time period;
initially setting, with the at least one application module, all of the list of BDEMs as inactive;
partitioning, with the at least one application module, the egress area into a number of sub-regions for launching the arbitrarily-shaped objects, each of the sub-regions being so sized that the BDEMs can be placed therein without interference;
initially setting, with the at least one application module, all sub-regions with a status of 'open'; and
obtaining, with the at least one application module, numerically-simulated physical behaviors of the arbitrarily-shaped objects by conducting a time-marching simulation of releasing the list of BDEMs from the egress area onto the lower receiving surface in a plurality of solution cycles as follows:
(a) setting simulation time to the beginning of the predefined time period;
(b) placing respective arbitrarily-shaped objects into randomly-selected sub-regions having the status of 'open' by activating next relevant portion of the list of BDEMs based on the mass flow rate and time-step size;
(c) setting the status of the randomly-selected sub-regions that have been placed with the respective arbitrarily-shaped objects from 'open' to 'occupied';
(d) releasing the newly-activated BDEMs from the egress area onto the lower receiving surface;
(e) calculating a corresponding contact force in each detected contact amongst the activated BDEMs and/or between the activated BDEMs and the lower receiving surface;
(f) applying the contact force to each involved parties in said each detected contact to determine each activated BDEM's updated location and to update internal forces in the corresponding connection bonds;
(g) setting the status of those corresponding sub-regions from 'occupied' to 'open', when the activated BDEMs have moved entirely out of the egress area;
(h) incrementing the simulation time by the time-step size; and
(i) repeating (b)-(h) for next solution cycle until the simulation time has passed the end of the predefined time period.

14. The non-transitory computer readable medium of claim 13, wherein the ingress area comprises a rectangular area.

15. The non-transitory computer readable medium of claim 13, wherein the ingress area comprises an elliptical area.

16. The non-transitory computer readable medium of claim 13, wherein the lower receiving surface is a conveyor belt surface traveling at a preset speed.

17. The non-transitory computer readable medium of claim 13, wherein the size of each sub-region is based on a largest dimension of the BDEMs with an additional margin of safety.

18. The non-transitory computer readable medium of claim 13, said releasing the activated BDEMs from the egress area onto the lower receiving surface is achieved with an initial velocity.

* * * * *